(12) United States Patent
Fulghum (10) Patent No.: US 6,314,148 B1
(45) Date of Patent: Nov. 6, 2001

(54) SYNCHRONIZATION TRACKING METHOD

(75) Inventor: Tracy Lawrence Fulghum, Durham, NC (US)

(73) Assignee: Ericsson INC, Research Triangle Park, NC (US)

( * ) Notice: Subject to any disclaimer, the term of this patent is extended or adjusted under 35 U.S.C. 154(b) by 0 days.

(21) Appl. No.: 09/207,351

(22) Filed: Dec. 8, 1998

(51) Int. Cl.$^7$ ........................................................ H04L 7/00
(52) U.S. Cl. ............................................. 375/355; 375/324
(58) Field of Search ................................. 375/355, 324, 375/340, 341

(56) References Cited

U.S. PATENT DOCUMENTS

| | | |
|---|---|---|
| 5,263,053 | 11/1993 | Wan et al. . |
| 5,577,068 | * 11/1996 | Bottomley et al. ................. 375/348 |
| 5,596,607 | * 1/1997 | Larsson et al. ..................... 375/340 |
| 5,619,524 | 4/1997 | Ling et al. . |

FOREIGN PATENT DOCUMENTS 0 757 458 A2    2/1997    (EP) .

WO 98/38742    3/1998    (WO) .

* cited by examiner

Primary Examiner—Temesghen Ghebretinsae
(74) Attorney, Agent, or Firm—Coats & Bennett (57) ABSTRACT

A demodulator operates in a multipath (ISI) channel carrying transmitted symbols. The demodulator receives a signal representing a transmitted sequence, and develops an output sample at a select sampling phase corresponding to a synchronization point. Plural hypothetical samples representing plural hypothetical sequences are generated. The output sample is compared to the plural hypothetical samples to determine plural metrics and develop an original estimate of each transmitted sequence based on the hypothetical sequence producing a best metric. The hypothetical samples are compared to the received sample taken at an early sampling phase in advance of the select sampling phase and to the received sample at a late sampling phase delayed from the select sampling phase to determine if a second estimate of the transmitted symbol produces a better metric than the original estimate, and in response to the second estimate producing a better metric adjusting the synchronization point.

11 Claims, 5 Drawing Sheets

SYNCHRONIZATION TRACKING METHOD

FIELD OF THE INVENTION

This invention relates to a receiver demodulator using channel estimation and, more particularly, to maintenance of an optimum synchronization point for demodulation.

BACKGROUND OF THE INVENTION

In a typical RF communication system, a transmitted signal may travel from a transmitter to a receiver over multiple paths, for example, a direct path and also a reflected path. The signal on the reflected path typically arrives later than the signal on the direct path. Thus, the received signal exhibits distortion due to the time dispersive nature of a channel. Channel environments such as this are also known as multipath fading channels.

In digital advance mobile phone systems (DAMPS), an equalizer or demodulator typically operates based on the assumption that the transmitted signal encounters a symbol-spaced, two-tap multipath channel, regardless of the actual prevailing channel conditions. In order to demodulate the received signal, it is necessary to synchronize the receiver to a known synchronization sequence contained in the signal. This can be done initially by correlating the received waveform against a local version of the synch word. The synchronization point in a stream of oversampled received data is chosen which maximizes the sum of two points, one associated with each tap of the channel estimate, of a squared correlation taken at two different lags taken a symbol interval apart. By choosing the synchronization point that maximizes the sum, the correlated received power at symbol taps is maximized. This matches the symbol-spaced two-tap channel estimate in time to the actual channel in a maximum power sense.

When rapid fading is present, actual channel conditions at the beginning of a slot burst may substantially change over the transmission of that burst. The conditions for matching the channel estimate in time to the channel in a maximum power sense may change substantially as well. This can result in the optimum synchronization point shifting over the course of the burst. If the same symbol sampling phase is used, then the channel estimate becomes no longer matched in time to the actual channel in that maximum power sense.

The present invention is directed to overcoming one or more of the problems discussed above in a novel and simple manner.

SUMMARY OF THE INVENTION

In accordance with the invention there is disclosed a synchronization tracking system and method that recalculates metrics in an equalizer using samples delayed from and in advance of a current sample.

Broadly, there is disclosed herein a demodulator for a receiver operating in a multipath channel carrying transmitted symbols. The demodulator is comprised of means to receive a signal representing a transmitted sequence of symbols and to produce output samples at a select sampling phase corresponding to a synchronization point. Means are provided for generating hypothetical samples from hypothetical sequences. A first means compares the output sample to the plural hypothetical samples to determine plural metrics and developing an original estimate of each transmitted sequence based on the hypothetical sample producing a best cumulative metric. A second means compares the hypothetical samples to the received sample at an early sampling phase in advance of the select sampling phase and to the received sample at a late sampling phase delayed from the select sampling phase and determining if a second estimate of the transmitted symbol produces a better metric than the original estimate, and in response to the second estimate producing a better metric adjusting the synchronization point.

It is a feature of the invention that the second means compares only the hypothetical sample producing the best metric to the received sample at the early sampling phase in advance of the select sampling phase and to the received sample at the late sampling phase delayed from the select sampling phase.

In accordance with another aspect of the invention there is disclosed a demodulator for a receiver operating in a multipath channel carrying a transmitted sequence of symbols. The demodulator includes means for sampling a received signal representing the transmitted sequence of symbols and developing an output signal at a select number of samples per symbol at a select sampling phase corresponding to a synchronization point. Means generate plural hypothetical sequences of symbols and associated hypothetical samples. A first means compares the output signal to the plural samples from hypothetical sequences of symbols to determine plural metrics and develop an original estimate of the transmitted sequence of symbols based on the hypothetical sequence producing a best metric. A second means compares the plural hypothetical samples to the received signal at an early sampling phase in advance of the select sampling phase and to the received signal at a late sampling phase delayed from the select sampling phase. Based on whether the metric calculated from this comparison is better than the metric from the original comparison, the synchronization point is adjusted.

It is a feature of the invention that the second means compares only the hypothetical sequence of symbols producing the best metric to the received signal at the early sampling phase in advance of the select sampling phase, and to the received signal at the late sampling phase delayed from the select sampling phase.

It is a further feature of the invention that the plural metrics determined by the first comparing means comprise cumulative metrics.

It is still another feature of the invention that the metrics produced by the second comparing means comprise cumulative metrics.

It is still another feature of the invention that the first comparing means comprises a maximum likelihood sequence estimator.

There is disclosed in accordance with another aspect of the invention a method of demodulating the received signal in a multipath channel carrying a transmitted sequence of symbols. The method comprises the steps of sampling the received signal representing the transmitted sequence of symbols and developing an output signal at a select number of samples per symbol at a select sampling phase corresponding to a synchronization point, generating plural hypothetical sequences of symbols and from these, generating plural hypothetical received samples based on the current estimation of the channel, comparing the output signal to the plural hypothetical samples to develop original metrics for the hypothetical received sequences, resampling the received signal at sampling phases earlier and later than the sampling phase corresponding to the synchronization point, comparing the hypothetical samples with the early and late samples to develop early and late metrics, and adjusting the synchronization point base on which of the original, the early, or the late metrics is a best metric.

More particularly, the demodulator maintains the optimum synchronization point even where placement of taps of the channel estimate are mismatched to the placement of taps in the actual channel, and the fading of the channel is rapid with respect to the length of the burst transmission. The demodulator makes use of the calculation of metrics which utilize received signal samples which are in advance of a current sampling point and samples which are delayed from a current sampling point. By comparing these metrics with the metrics calculated with the current, present sampling point, a timing offset is altered to steer the optimum synchronization point in a direction which shows the best calculated metric.

Further features and advantages of the invention will be readily apparent from the specification and from the drawing.

DETAILED DESCRIPTION OF THE INVENTION

Figure 1:
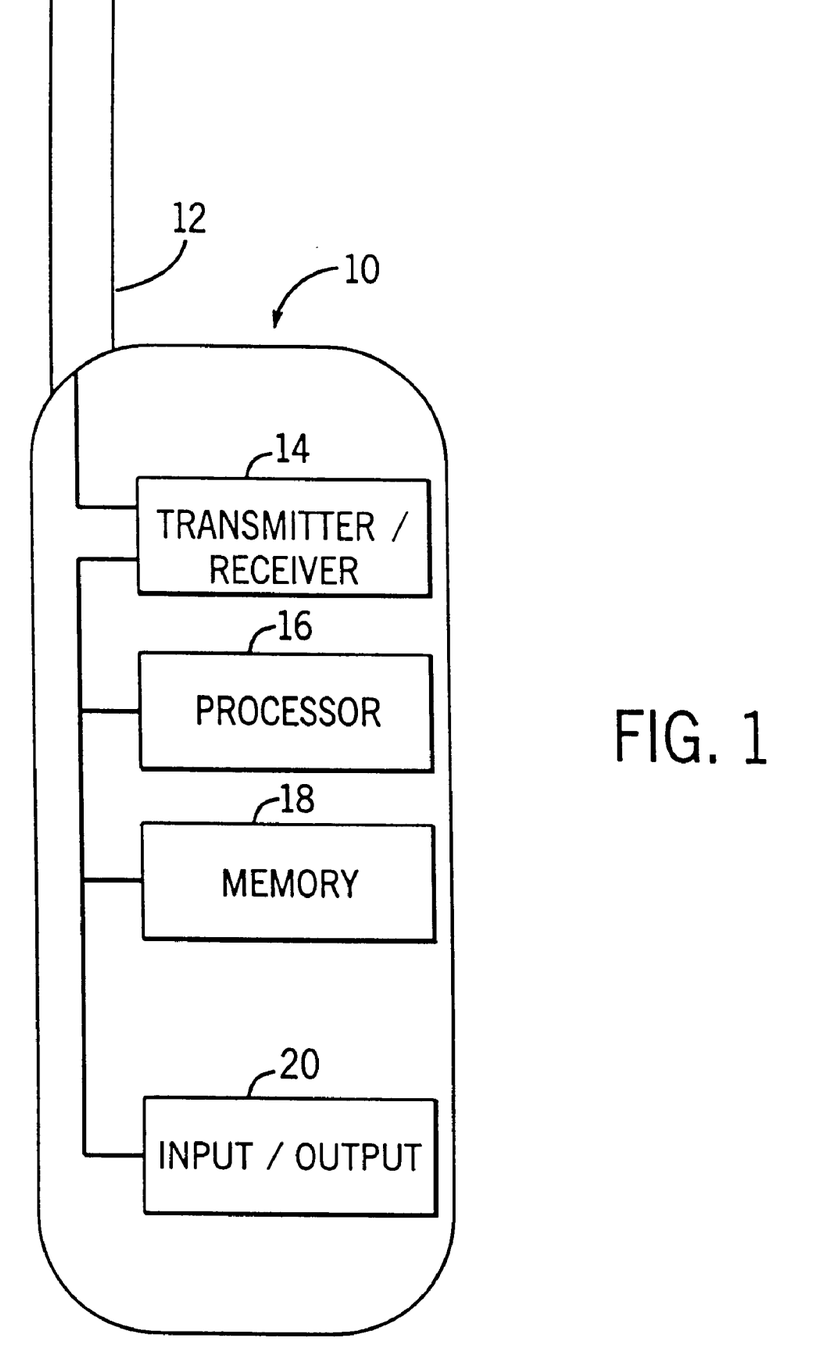
FIG. 1 is a generalized block diagram of a mobile telephone including a receiver according to the invention.

FIG. 1 illustrates a typical mobile phone 10 including a demodulator according to the invention. The phone 10 includes an antenna 12 for sending and receiving radio signals between itself and a radio communication system, such as a cellular communication system. The antenna 12 is connected to a transmitter/receiver circuit 14 to transmit radio signals to the network and likewise receiver radio signals from the network. A programmable processor 16 controls and coordinates the functioning of the phone responsive to messages on a control channel using programs and data stored in a memory 18. The processor 16 also controls operation of the phone 10 responsive to input from an input/output circuit 20. The input/output circuit 20 may be connected to a keypad as a user input device in a display to give the user information, as is conventional.

Figure 2:
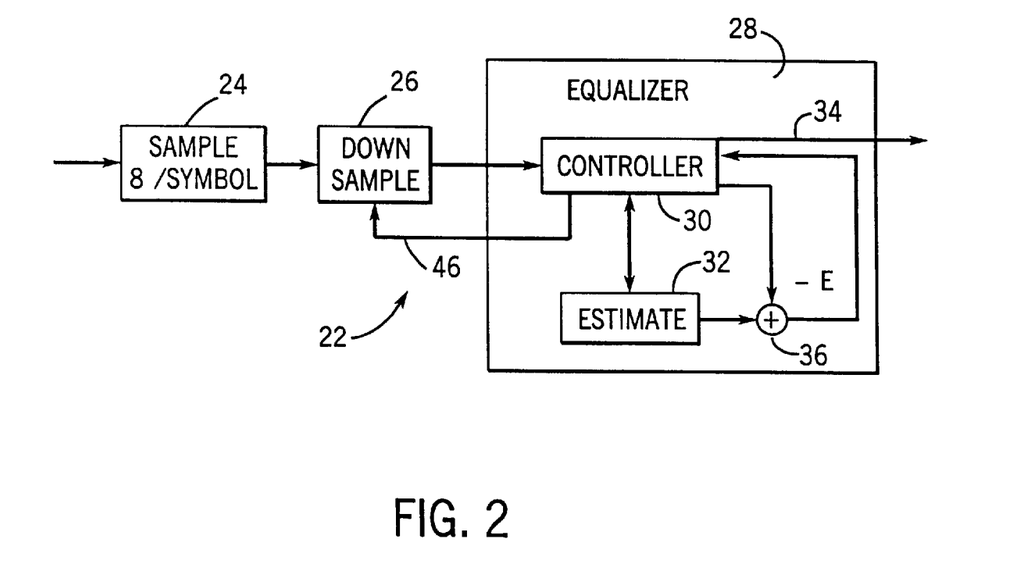
FIG. 2 is a functional block diagram illustrating the demodulator according to the invention.

Referring to FIG. 2, a block diagram illustrates a demodulator 22 for a receiver used in the phone 10. The function of the demodulator 22 may be implemented in circuitry of a receiver portion of the transmitter/receiver circuit 14, or software in the processor 16, or a combination of both.

The signal received by the antenna 12 is an RF signal. The RF signal is converted to baseband in a conventional manner and supplied to a sample block 24. In the illustrated embodiment of the invention the sample block 24 takes eight samples per symbol of the received signal. The output of the sample block 24 is input to a down sample block 26. The received signal at baseband is oversampled by a factor N. In the illustrated embodiment of the invention, N=8. In other words, the received signal is sampled at a rate N times the symbol rate. The sampled data is buffered in an array in the memory 18 where x[n] is the $n^{th}$ element or sample in the array. The down sample block 26 subsamples the data down to symbol rate, $$r[k]=x[kN+n_0],$$

where $n_0$ is the beginning point of the burst transmission, as determined by an initial synchronization routine, and r[k] is the sample corresponding to the $k^{th}$ symbol. The received sample r[k] is used to calculate metrics using maximum likelihood sequence estimation (MLSE) in an equalizer 28. In the illustrated embodiment of the invention, the equalizer 28 utilizes the well known Viterbi algorithm. Using a conventional Viterbi equalizer, the use of the sampling phase $n_0$ for the receiver processing is restricted to that determined at the beginning of the slot. In accordance with the invention, an offset, $n_{off}$ is used such that $$r[k]=x[kN+n_0+n_{off}],$$

where $n_{off}$ can be positive or negative and can vary over the course of the demodulation. In accordance with the invention the innovative equalizer 28 alters that offset by recalculating metrics in a Viterbi equalizer using samples delayed from and in advance of the current sample, or "late" and "early" samples.

An estimate block 32 generates hypothetical sequences of symbols, each of which is fed through an estimated model of the channel, producing hypothetical samples to be fed to a summer 36. A controller 30 feeds a received signal sample to the summer 36 to be subtracted from the hypothetical received sample to produce an error, which is squared in the controller 30 to produce a metric. The controller 30 then associates this metric with the appropriate hypothetical sequence, and forms cumulative metrics based on the sequence and associated metrics. These metrics are processed by the controller 30 using the Viterbi algorithm to produce a final output sequence of symbols on a line 34 which is the most likely to have been transmitted. The Viterbi algorithm is well known in the art.

Figure 6:
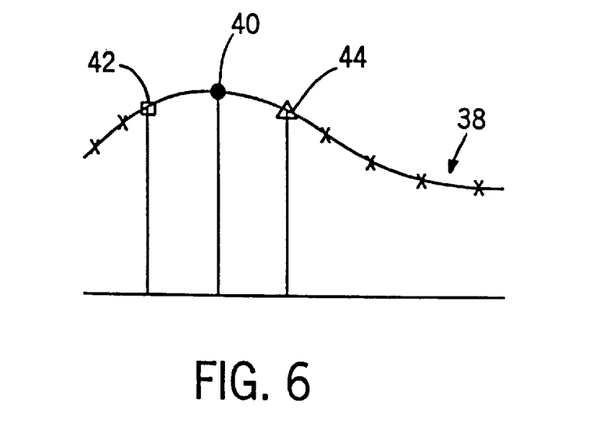
FIG. 6 is a curve illustrating early and delayed sampling points implemented by the phone of FIG. 1 in accordance with the invention.

Referring also to FIG. 6, a curve 38 represents the received signal. In the illustrated embodiment, eight samples are obtained per symbol. The particular sample output by the downsample block 26 is illustrated with a dot 40. In accordance with the invention, the equalizer 28 also uses an early sample, illustrated as a square 42, and a late sample, illustrated with a triangle 44. The equalizer 28 calculates metrics associated with the early and late samples to determine whether or not the sampling phase should be made earlier or later, and develops a corresponding control signal on a line 46 to the downsample block 26. The use of the early and late metrics are for the purposes of observing changes in the channel during transmission.

Figure 3:
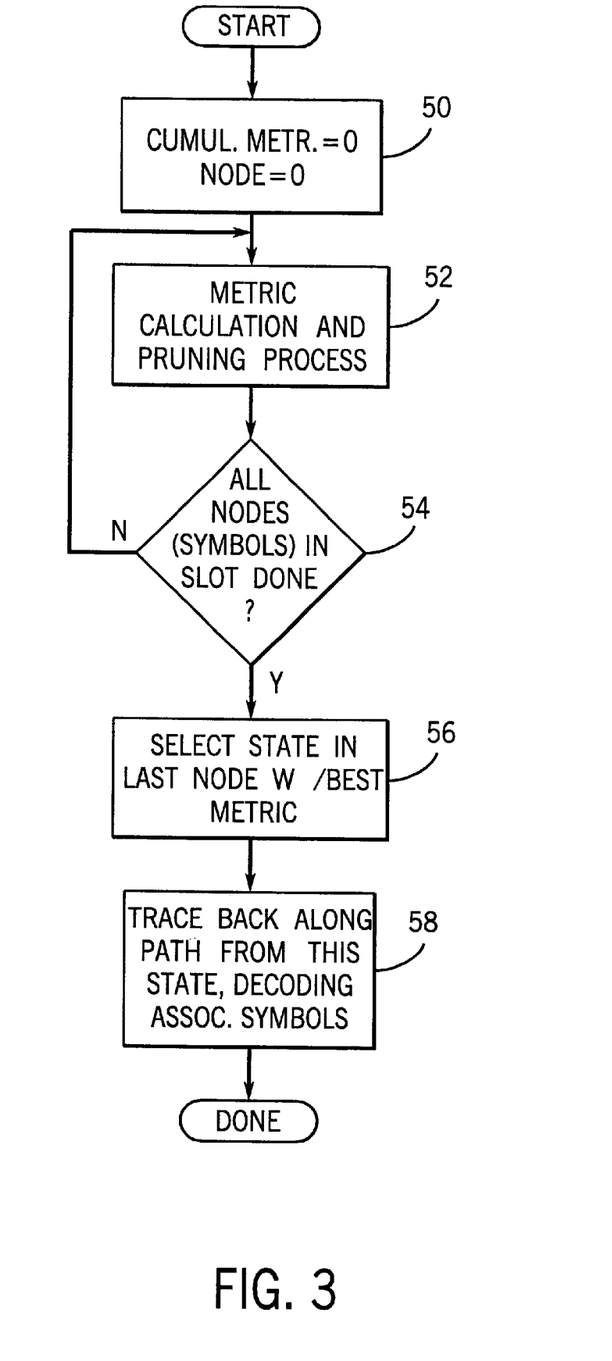
FIGS. 3–5 illustrate a flow diagram of a program implemented by the processor of FIG. 1.
Figure 4:
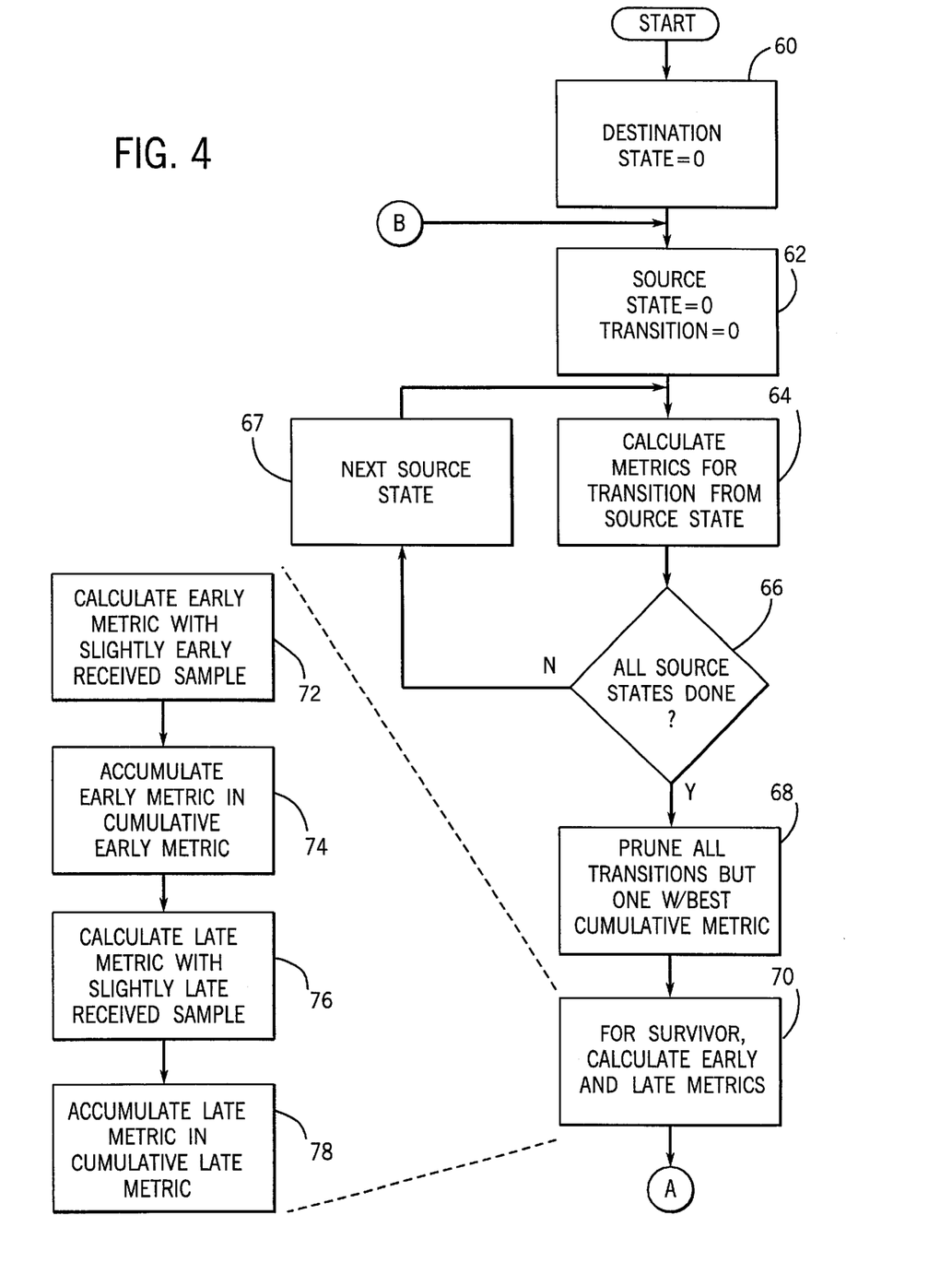
Figure 5:
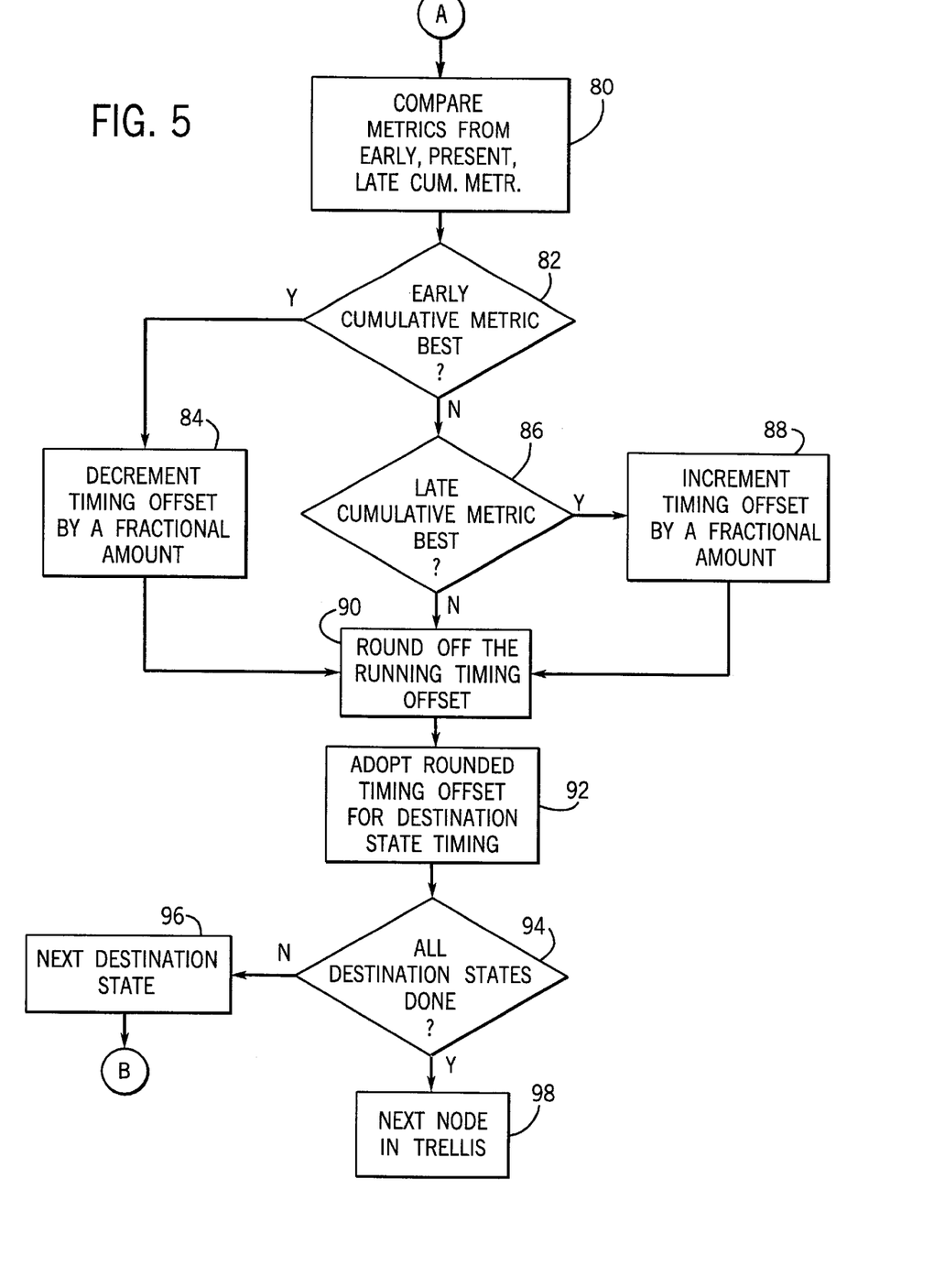

Referring to FIGS. 3–5, a flow diagram illustrates the synchronization tracking method according to the invention implemented in the control block 30 of FIG. 2.

FIG. 3 generally describes the process of the Viterbi algorithm as is known in the art. The Viterbi operates with a trellis consisting of multiple nodes, each representing a symbol time interval, each with multiple states. Each state in a node represents a possible state for the received sample. The states are connected from node to node by transitions, representing a possible transmitted symbol. By calculating metrics for all the transitions at a given node and creating cumulative metrics, then comparing these cumulative metrics, a significant number of possible received sequences can be eliminated by only keeping the transition to a state which has the best metric.

When the process starts, a cumulative metric is set equal to zero and node equal to zero at a block 50. A metric is calculated and pruning process implemented for each node at a block 52. A decision block 54 determines if all nodes, i.e., symbols, in the slot are done. If not, then control returns back to the block 52. When all nodes are done, then a block 56 selects the state in the last node that produced the best cumulative metric at a block 56. Which metric is "best" depends on the particular process being used, as is well known. The process then traces back along the path from this state to decode the associated symbols at a block 58. The demodulation routine is then done.

Referring to FIG. 4, a flow diagram illustrates the methods used in the metric calculation and pruning process performed at the block 52 of FIG. 3. Initially, the destination state is initialized to zero at a block 60. Then begins a loop to calculate metrics for transitions from all possible source states. A block 62 initializes the source state and transition to zero. Metrics are calculated at a block 64 for a particular source state and transition. A cumulative metric is created for the transition by adding the metric for that transition to the cumulative metric of the source state of that transition. This is repeated for all possible source states until a decision block 66 determines that all source states have been processed. If they have not, then a block 67 sets the source state to the next state and returns to the block 64. Once all states have been processed, then at a block 68 all transitions except the one with the best cumulative metric are pruned to provide a survivor transition to this destination state from one source state. The destination state then adopts the cumulative metric of the survivor transition as its own cumulative metric. Early and late metrics are calculated for the survivor at a block 70. Particularly, this function is illustrated in expanded form, wherein the early metric with a slightly earlier received sample, see 42 of FIG. 6, is calculated at a block 72. The early metric is added to a cumulative metric from the source state of the survivor transition to form an early cumulative metric at a block 74. A late metric is calculated with a slightly late received sample, see 44 of FIG. 6, at a block 74. The late metric is added to a cumulative metric from the source state of the survivor transition to form a late cumulative metric at a block 78.

Once all transitions are done for a destination state, with reference to FIG. 5, a block 80 compares the metrics from the early, present and late cumulative metrics. A decision block 82 determines if the early cumulative metric is the best. If so, a timing offset C which is adopted by the destination state from the source state of the survivor transition is decremented by a select fractional amount at a block 84. If the early cumulative metric was not the best, as determined at the decision block 82, then a decision block 86 determines if the late metric is best. If so, then the adopted timing offset r for the destination state is incremented by a select fractional amount at a block 88 and control then proceeds to the block 90. If the late cumulative metric was not the best, as determined at the decision block 86, then the present cumulative metric is the best and control proceeds to the block 90.

At the block 90, the resulting timing offset $\tau$ for the destination state is used to produce a running timing offset by rounding the $\tau$ value to an integer value. This running timing offset is adapted by the destination state at a block 92 and will be used to determine the timing of the samples for calculation of the metrics of transitions from this state at the next node (when this state becomes a source state). A decision block 94 tests to see if all destination states in the node have been processed. If so, control proceeds to a block 98, and the process is repeated for the next node. If all destination states have not been processed for this node, as determined at the block 94, then the process is repeated for the next destination state at a block 96, returning via node B to FIG. 4.

The method described above follows the basic tenets of per survivor processing (PSP). Initial synchronization is performed using conventional methods in which a symbol sampling phase is chosen in the oversampled received data.

More particularly, each state in the trellis maintains a real number offset, $\tau_{off}^{state}$, which is expressed in terms of sampling time $T_s$, where $T_s = T/N$, and T is the symbol time. This real number is used to determine the integer offset for sampling:

$$n_{off}^{sta} = \text{round}(\tau_{off}^{sta}).$$

In the Viterbi equalizer, metrics are calculated for each transition from each state in the trellis. In this PSP implementation, each state uses a particular sampling phase offset, $n_{off}^{sta}$. To create the symbol rate sample for calculating the metric for transitions from that state, $$r^{sta}[k] = x[kN + n_0 + n_{off}^{sta}].$$

For the basic Viterbi process, these transition metrics are added to cumulative metrics of the source state of the transition, creating a cumulative metric for each transition. Based on these metrics, the transitions to a state are pruned to leave the transition with the best cumulative metric (the lowest in the case of our terminal implementation) as the survivor.

The basic idea behind tracking this synchronization point is that while in the process of calculating the metric for each transition in the Viterbi trellis using the present sampling phase, the metric for a parallel transition is calculated using a sampling phase that is earlier than the present sampling phase, and for a parallel transition using a sampling phase that is later than the present sampling phase, or $$r_{early}^{sta}[k] = x\lfloor kN + n_0 + n_{off}^{sta} - 1 \rfloor$$

$$r'_{late}^{sta}[k] = x \blacklozenge kN + n_0 + n_{off}^{sta} + 1 \rfloor.$$

In this manner, if there is a shift in the channel conditions that would warrant an early or later sampling phase, this would manifest itself in a better metric calculated for an early or late sample.

To update the offset for each state, $\tau_{off}^{state}$, the new state inherits the offset from the state which is at the source of the surviving transition, $$\tau_{off}^{new} = \tau_{off}^{old}.$$

The inherited offset is then updated based on the result of the early metric and late metric calculation. For a given state, if the early metric of the surviving transition is the best, then the offset is decremented by a step size, $\alpha$, $$\tau_{off}^{new} = \tau_{off}^{new} - \alpha.$$

If the late metric is the best for the surviving transition, then the offset is incremented by $\alpha$, $$\tau_{off}^{new} = \tau_{off}^{new} + \alpha$$

Otherwise, if the original, present, metric prevails over the early and late metrics, the offset is left alone. In this manner, the synchronization offset is steered in the direction (earlier or later) which shows the best calculated metric. For this method, generally a small step size (<0.5, or half of a sample time period) is desirable so that the synchronization does not change immediately on the encounter of a good early or late metric, but requires a number of increments before the actual synchronization offset $n_{off}^{sta}$ is affected.

There are number of variations on the method discussed above, some of which are a subset of the process (and reduced in complexity) and some of which are a superset of the process (and generally increased in complexity).

Instead of calculating the early and late metrics for only the surviving transitions as above, the early and late metrics can be calculated for all transitions (in this example, the total number of metric calculations would be 48). Then, pruning of the transitions could be made based on all metrics, not just the present metric as discussed earlier. The update of the timing offset would be made based on which metric (early, late, or present) was used which allowed a transition to survive. The metric for the path, then, would be summed into a single cumulative metric. This implies that a path through the trellis would be comprised of transitions which were based on metrics calculated at potentially many different synchronization points.

The invention as discussed above is fashioned based on per survivor processing principals, where a separate timing offset is maintained for each state in the equalizer trellis. It is not necessary to do this, however, and the process can be simplified to the maintaining of a single sampling offset which is the basis for the samples used for all metric calculations. Since there is a single offset to be maintained, the surviving transitions can be narrowed down to one on which to base the update. This could be accomplished by examining the cumulative metrics associated with each surviving transition, and taking the one with the best cumulative metric (a process which is done to choose the best path for making symbol decisions). The "winner" transition would then have early and late metrics calculated for it, and the update could be based on the prevailing transition metric.

Thus, in accordance with the invention, the timing offset is steered to an optimum synchronization point in a direction which provides the best calculated metric. This tracking of the shift in the synchronization point keeps the symbol spaced channel estimate matched in time as much as possible to the actual channels, thus improving the performance of an MLSE equalizer.

While this invention is disclosed in connection with an MLSE equalizer, such is not required to carry out the invention. The invention may be used with other kinds of demodulators, such as differential detectors, as will be apparent.

As will be appreciated by one of ordinary skill in the art, the present invention may be embodied as methods or devices. Accordingly, the present invention may take the form of an entirely hardware embodiment, an entirely software embodiment, or an embodiment combining hardware and software aspects. The present invention has been described in part with respect to the flow chart illustrations of FIGS. 3–5 of an embodiment of the present invention. It will be understood that each block of the flow chart illustration, and combinations of blocks in the flow chart illustration, can be implemented by computer program instructions. These program instructions, which represent steps, may be provided to a processor to produce a machine.

Accordingly, blocks of the flow chart illustration support combinations of means for performing the specified functions in combinations of steps for performing the specified functions. It will be understood that each block of the flow chart illustrations, and combinations of blocks in the flow chart illustrations, can be implemented by special purpose hardware-based systems which perform the specified functions or steps, or combinations of special purpose hardware and computer instructions.

I claim:

1. A demodulator for a receiver operating in a multipath channel carrying transmitted symbols, the demodulator comprising:

sampling means for receiving a signal representing a transmitted sequence of symbols and developing output samples at a select sampling phase corresponding to a synchronization point;

means for generating plural hypothetical samples from hypothetical sequences;

first means for comparing the output samples to the plural hypothetical samples to determine plural metrics and developing an original estimate of each transmitted sequence based on the hypothetical sample producing a best metric; and second means for comparing the hypothetical samples to received samples at an early sampling phase in advance of the select sampling phase and to received samples at a late sampling phase delayed from the select sampling phase and determining if a second estimate of the transmitted symbol produces a better metric than the original estimate and in response to the second estimate producing a better metric adjusting the synchronization point.

2. The demodulator of claim 1 wherein the second means compares only the hypothetical sample producing the best metric to the received sample at the early sampling phase in advance of the select sampling phase and to the received sample at the late sampling phase delayed from the select sampling phase.

3. A demodulator for a receiver operating in a multipath channel carrying a transmitted sequence of symbols, the demodulator comprising:

sampling means for sampling a received signal representing the transmitted sequence of symbols and developing an output signal at a select number of samples per symbol at a select sampling phase corresponding to a synchronization point;

means for generating plural hypothetical sequences of symbols and associated hypothetical samples;

first means for comparing the output signal to the samples from the hypothetical sequences of symbols to determine plural metrics and developing an original estimate of the transmitted sequence of symbols based on the hypothetical sequence producing a best metric; and second means for comparing the plural hypothetical samples to the received signal at an early sampling phase in advance of the select sampling phase and to the received signal at a late sampling phase delayed from the select sampling phase to produce a second estimate of the transmitted sequence of symbols and if the second estimate produces a better metric than the original estimate adjusting the synchronization point.

4. The demodulator of claim 3 wherein the second means compares only the hypothetical sequence of symbols producing the best metric to the received signal at the early sampling phase in advance of the select sampling phase and to the received signal at the late sampling phase delayed from the select sampling phase.

5. The demodulator of claim 3 wherein the plural metrics determined by the first comparing means comprise cumulative metrics.

6. The demodulator of claim 3 wherein metrics produced by the second comparing means comprises cumulative metrics.

7. The demodulator of claim 3 wherein the first comparing means comprises a maximum likelihood sequence estimator.

8. A method of demodulating a received signal in a multipath channel carrying a transmitted sequence of symbols, the method comprising the steps of:

sampling the received signal representing the transmitted sequence of symbols and developing an output signal at a select number of samples per symbol at a select sampling phase corresponding to a synchronization point;

generating plural hypothetical sequence of symbols and from these, generating plural hypothetical received samples based on a current estimation of the channel;

comparing the output signal to the plural hypothetical received samples to develop original metrics for the plural hypothetical sequences of symbols;

resampling the received signal at sampling phases earlier and later than the sampling phase corresponding to the synchronization point;

comparing the hypothetical received samples with the early and late samples to develop early and late metrics; and adjusting the synchronization point based on which of the original, early and late metrics is a best metric.

9. The method of claim 8 wherein the second comparing step compares only the hypothetical sequence of symbols producing the best metric to the received signal at the early sampling phase in advance of the select sampling phase and to the received signal at the late sampling phase delayed from the select sampling phase.

10. The method of claim 8 wherein comparing the output signal to the plural hypothetical received samples determines plural cumulative metrics.

11. The method of claim 8 wherein comparing the hypothetical received samples with early and late samples produces cumulative metrics.

* * * * *